US009930693B2

(12) United States Patent
Lee et al.

(10) Patent No.: US 9,930,693 B2
(45) Date of Patent: Mar. 27, 2018

(54) WIRELESS NETWORK, ACCESS POINT, AND TERMINAL

(71) Applicant: INTELLECTUAL DISCOVERY CO., LTD., Seoul (KR)

(72) Inventors: Tae Jin Lee, Suwon-si (KR); Chul Wan Park, Suwon-si (KR); Chang Yeong Oh, Suwon-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 86 days.

(21) Appl. No.: 14/266,175

(22) Filed: Apr. 30, 2014

(65) Prior Publication Data

US 2014/0321305 A1   Oct. 30, 2014

(30) Foreign Application Priority Data

Apr. 30, 2013  (KR) .................. 10-2013-0048968

(51) Int. Cl.
*H04W 74/04* (2009.01)
*H04W 72/04* (2009.01)
*H04W 48/08* (2009.01)
*H04W 74/00* (2009.01)

(52) U.S. Cl.
CPC ....... *H04W 74/04* (2013.01); *H04W 72/0446* (2013.01); *H04W 48/08* (2013.01); *H04W 74/006* (2013.01)

(58) Field of Classification Search
CPC ............. H04W 74/006; H04W 74/04; H04W 72/0446; H04W 48/08; H04W 28/02
USPC ................................................. 370/252, 336
See application file for complete search history.

(56) References Cited

U.S. PATENT DOCUMENTS

| 6,285,662 B1 * | 9/2001 | Watanabe ......... H04W 74/0841 370/280 |
| 8,477,743 B2 | 7/2013 | Hole |
| 8,509,198 B2 | 8/2013 | Hole et al. |
| 2005/0135295 A1 * | 6/2005 | Walton .................. H04W 74/00 370/328 |
| 2008/0034107 A1 | 2/2008 | Lee et al. |

(Continued)

FOREIGN PATENT DOCUMENTS

| JP | 2013179461 A  *  9/2013 ............ H04W 74/08 |
| KR | 10-2014-0008261 A    1/2014 |

OTHER PUBLICATIONS

Wozniak et al., "Analysis of bandwidth reservation algorithms in HIPERLAN/2", Feb. 2004, Journal of Telecommunications and Information Technology, No. Feb. 2004, pp. 54-59.*

(Continued)

*Primary Examiner* — Un C Cho
*Assistant Examiner* — Shah Rahman
(74) *Attorney, Agent, or Firm* — Sughrue Mion, PLLC (57) ABSTRACT

Wireless network, access point, and terminal are disclosed. A method for determining a size of an access window performed in an access point in a wireless network may comprise estimating a number of terminals attempting to access uplink (hereafter, uplink access attempt terminals) in a first access window including at least one uplink slot which is allocated to the terminal or is randomly selected by the terminal so as to transmit uplink data; and determining a size of a second access window next to the first access window based on the estimated number of the uplink access attempt terminals.

13 Claims, 7 Drawing Sheets

(56) References Cited

U.S. PATENT DOCUMENTS

| | | | | | |
|---|---|---|---|---|---|
| 2008/0240049 | A1* | 10/2008 | Gaur | ................... | H04W 72/10 370/338 |
| 2011/0134779 | A1* | 6/2011 | Kim | ................... | H04W 74/085 370/252 |
| 2012/0051251 | A1* | 3/2012 | Seo | ................... | H04L 43/0847 370/252 |
| 2012/0315943 | A1* | 12/2012 | Chu | ................. | H04W 74/0866 455/512 |
| 2013/0003575 | A1* | 1/2013 | Konishi | ........... | H04W 74/0841 370/252 |
| 2013/0128798 | A1* | 5/2013 | Liu | ...................... | H04W 48/12 370/312 |
| 2014/0003414 | A1* | 1/2014 | Choudhury | ......... | H04W 74/006 370/347 |
| 2014/0071900 | A1* | 3/2014 | Park | ................... | H04W 74/04 370/329 |
| 2014/0126461 | A1* | 5/2014 | Ghosh | ................. | H04W 88/04 370/315 |
| 2014/0254497 | A1* | 9/2014 | Ghosh | ................. | H04W 74/04 370/329 |
| 2015/0029922 | A1* | 1/2015 | Zheng | ............... | H04W 52/0216 370/311 |
| 2015/0071211 | A1* | 3/2015 | Seok | ................... | H04W 74/04 370/329 |
| 2015/0173015 | A1* | 6/2015 | Lee | ................... | H04W 52/0216 370/311 |
| 2015/0334742 | A1* | 11/2015 | Kim | ...................... | H04W 74/04 370/328 |
| 2016/0021680 | A1* | 1/2016 | Choi | ................. | H04W 52/0216 370/311 |

OTHER PUBLICATIONS

Ma et al., "Dynamic Optimization of IEEE 802.11 CSMA/CA Based on the Number of Competing Stations", Jun. 2004, IEEE Communications Society, Proc. IEEE Int'l Conf. Comm. (ICC '04), pp. 191-195.*

* cited by examiner

| procedure Proposed_Method() |
|---|
| For the $i^{th}$ beacon interval<br>// Estimate no. of UL sensor devices in the $i^{th}$ RAW<br>$L^{(i)}$, $L_{UL}^{(i)}$, $L_{DL}^{(i)}$ are given. ($L^{(i)}=L_{UL}^{(i)}+L_{DL}^{(i)}$)<br>Measure(count) no. of success slots in RAW($\tilde{N}_{succ}^{(i)}$)<br>Compute $\tilde{P}_{succ}^{(i)}=\tilde{N}_{succ}^{(i)}/L_{UL}^{(i)}$<br>Compute $\hat{N} = f^{-1}(L_{UL}^{(i)}, \tilde{P}_{succ}^{(i)})$<br>// Determine RAW size for the $(i+1)^{th}$ RAW<br>Decide $L_{UL}^{(i+1)}=\min[\max\{L_{UL,min},\lceil L_{UL}^{*}\rceil\}, L_{UL,max}]$<br>Decide $L_{DL}^{(i+1)}$<br>// $L_{DL}^{(i+1)}$ is determined by the AP's queue at the start of<br>beacon interval<br>Decide $L^{(i+1)}=L_{UL}^{(i+1)}+L_{DL}^{(i+1)}$<br>Compute $T_{RAW}^{(i+1)}=L^{(i+1)} \cdot T_{slot}$<br>end |

$L^{(i)}$ : Total no. of slots in the $i^{th}$ RAW $L_{UL}^{(i)}$ : No. of slots for UL in the $i^{th}$ RAW $L_{DL}^{(i)}$ : No. of slots for DL in the $i^{th}$ RAW $\tilde{N}_{succ}^{(i)}$ : No. of measured success slots with no collision in the $i^{th}$ RAW $\tilde{P}_{succ}^{(i)}$ : Measured success probability with no collision in the $i^{th}$ RAW

$f(\cdot)$ : Function defined by Eq.(8)

$T_{RAW}^{(i)}$ : Time duration of the $i^{th}$ RAW $T_{slot}$ : Time duration of a slot $\gamma^{*}$ : Optimal ratio between no. of slots for UL and no. of UL STAs

FIG. 7

WIRELESS NETWORK, ACCESS POINT, AND TERMINAL

CLAIM FOR PRIORITY

This application claims a priority to Korean Patent Applications No. 10-2013-0048968 filed on Apr. 30, 2013 in the Korean Intellectual Property Office (KIPO), the entire contents of which are hereby incorporated by reference.

BACKGROUND

1. Technical Field

Example embodiments of the present invention relate in general to a wireless network, an access point, and a terminal, and more specifically, to a technique for providing medium access opportunity to improve uplink throughput in the wireless network.

2. Related Art

In Institute of Electrical and Electronics Engineers (IEEE) 802.11ah task group (TG), the standardization of machine-to-machine (M2M) communications based on wireless fidelity (Wi-Fi) operating in sub-1 GHz bands has been being proceeded. A frame format supporting medium access for thousands of terminals has been defined based on features of the M2M communication in the standardization of the M2M communications.

SUMMARY

Accordingly, example embodiments of the present invention are provided to substantially obviate one or more problems due to limitations and disadvantages of the related art.

Example embodiments of the present invention provide a technique for improving efficiency (e.g., uplink throughput) in the wireless communication network.

In some example embodiment, a method for determining a size of an access window performed in an access point in a wireless network may comprise estimating a number of terminals attempting to access uplink medium (hereafter, uplink access attempt terminals) in a first access window including at least one uplink slot which is allocated to the terminal or is randomly selected by the terminal; and determining a size of a second access window next to the first access window based on the estimated number of the uplink access attempt terminals.

Here, the determining a size of a second access window comprises determining a number of the uplink slots to be included in the second access window based on the estimated number of the uplink access attempt terminals; and determining the size of the second access window based on the determined number of the uplink slots and at least one downlink slot (i.e., time slot used for downlink transmission) to be included in the second access window.

Here, the estimating a number of uplink access attempt terminals comprises measuring a number of the uplink slots in which the uplink data is successfully transmitted (hereafter, uplink access success slots) in the first access window; and estimating a number of the uplink access attempt terminals based on the measured number of the uplink access success slots.

Here, the estimating a number of uplink access attempt terminals comprises estimating the number of the uplink access attempt terminals based on the measured number of the uplink access success slots and the number of the uplink slots included in the first access window.

In other example embodiment, a method for determining a size of an access window performed in an access point in a wireless network may comprise measuring a number of uplink slots in which uplink data is successfully transmitted (hereafter, uplink access success slots) in a first access window including at least one uplink slot; and estimating a number of terminals attempting to access uplink medium (hereafter, uplink access attempt terminals) in the first access window based on the measured number of the uplink access success slots.

Here, the estimating a number of uplink access attempt terminals comprises estimating a number of the uplink access attempt terminals based on the measured number of the uplink access success slots and the number of the uplink slots included in the first access window.

Here, the estimating a number of the uplink access attempt terminals comprises estimating a probability of access success in the uplink slots without a collision (hereafter, uplink access success probability) based on the number of the uplink access success slots and the number of the uplink slots; and estimating the number of the uplink access attempt terminals based on the estimated uplink access success probability.

Here, the estimating a number of the uplink access attempt terminals comprises estimating the number of the uplink access attempt terminals based on the estimated uplink access success probability and the number of the uplink slots included in the first access window.

Here, the estimating a number of the uplink access attempt terminals comprises estimating the number of the uplink access attempt terminals based on the estimated uplink access success probability, the number of the uplink slots included in the first access window, and a predefined function indicating a relation between the uplink access success probability, the number of the uplink slots included in the first access window, and the number of the uplink access attempt terminals.

Here, the terminal attempts to access the uplink medium based on a random backoff contention procedure.

Here, the access window includes at least one downlink slot.

Here, the uplink slot is a time slot except the downlink slot in the access window.

Here, the access point sets the access window and a general access period in a beacon interval, and the terminal accesses medium for the general access period based on Enhanced Distributed Channel Access (EDCA) manner.

The summary provides simplified concepts in concepts which are described in following detailed description. The summary is not intended to identify fundamental or intrinsic features of subject matters of claimed present inventions. Also, the summary is not intended to limit a scope of the subject matters of the claimed present inventions. Also, the subject matters of the claimed inventions are not limited to configurations which resolve a part or entire of problems mentioned in arbitrary part of this specification. Above mentioned aspects, example embodiments, and features as well as additional aspects, example embodiments, and features will be clear based on following detailed description and figures.

BRIEF DESCRIPTION OF DRAWINGS

Example embodiments of the present invention will become more apparent by describing in detail example embodiments of the present invention with reference to the accompanying drawings, in which:

FIG. 6 is a program code to illustrate a method according to an example embodiment of the present invention, and more specifically, a method for determining size of the RAW.

DESCRIPTION OF EXAMPLE EMBODIMENTS

In the following detailed description, attached figures as a part of this specification will be referred. In the figures, like numbers refer to generally like elements except that the like numbers present contextually different meaning each other. Example embodiments described in the detailed description, the figures, and claims are not intended to limit a scope of the present invention. Other example embodiments without departing from the scope and idea of the present invention may be used. Also, other example embodiments may have changed configurations without departing from the scope and idea of the present invention. Aspects of the present invention generally described in this specification and illustrated in the figures may be arranged, substituted, combined, divided, and designed in a wide variety of different configurations. It may be clearly understood that the aspects is explicitly considered in the present invention.

Figure 1:
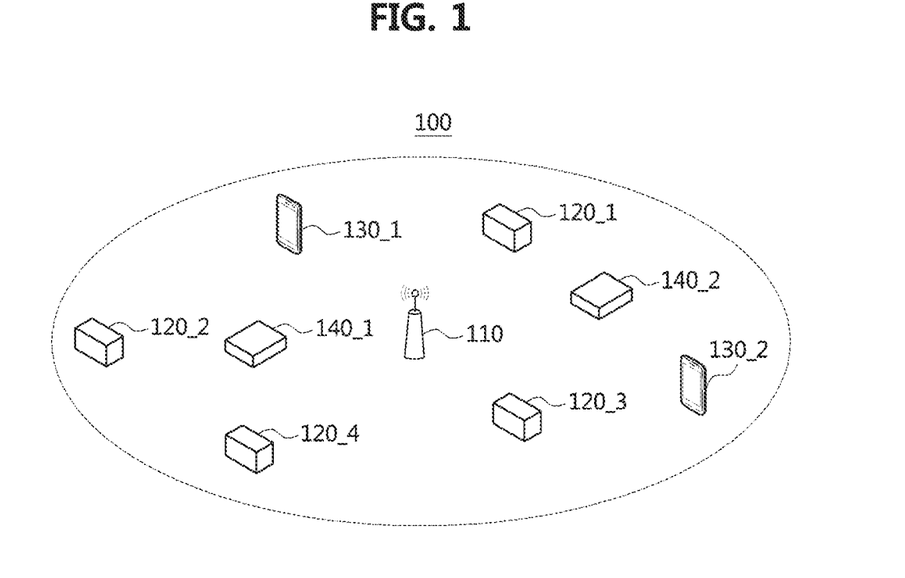
FIG. 1 is a conceptual diagram to illustrate a wireless network according to an example embodiment of the present invention.

FIG. 1 is a conceptual diagram to illustrate a wireless network according to an example embodiment of the present invention.

Referring to FIG. 1, the network 100 may include an access point (AP) 110, a plurality of terminals 120_1, 120_2, 120_3, 120_4, 130_1, 130_2, 140_1, 140_2. The plurality of terminals 120_1, 120_2, 120_3, 120_4, 130_1, 130_2, 140_1, 140_2 may be classified into first type terminals 120_1, 120_2, 120_3, 120_4, second type terminals 130_1, 130_2, and third type terminals 140_1, 140_2 according to difference of medium access manner, etc. For example, the third type terminals 140_1, 140_2 may support both the medium access manners of the first type terminals 120_1, 120_2, 120_3, 120_4 and the second type terminals 130_1, 130_2.

In the specification, for convenience of description, disclosed techniques will be described under an assumption that the network 100 is identical to a network based on Institute of Electrical and Electronics Engineers (IEEE) 802.11ah. However, one of ordinary skill in the art to which the present invention belongs may clearly understand that the disclosed techniques are not limited to the network based on IEEE 802.11ah.

A restricted access window (RAW) may include a plurality of time slots in IEEE 802.11ah. Also, every machine-to-machine (M2M) terminals operated in the network based on IEEE 802.11ah may support a wakeup mode and a sleep mode for energy saving. Each of the M2M terminals may be transferred from the sleep mode to the wakeup mode per a target beacon transmission time (TBTT) to receive a beacon frame including parameters related the RAW. The M2M terminals receiving the beacon frame may randomly select a time slot to be used for medium access for uplink transmission in time slots included in the RAW, or may receive information of allocated time slot to be used for medium access for uplink transmission in time slots included in the RAW from the AP. The M2M terminals may attempt to access medium in their own allocated time slot through a random backoff contention procedure based on Enhanced Distributed Channel Access (EDCA) manner. However, when the number of contending M2M terminals is more than the number of time slots included in the RAW, the uplink throughput may be decreased because collisions between frames transmitted from the contending M2M terminals are excessively generated. When the number of the contending M2M terminals is less than the number of time slots included in the RAW, the uplink throughput may be also decreased because empty time slots in which no frame is transmitted are generated.

The size of the RAW and the number of time slots included in the RAW may be determined based on a bitmap of Traffic Indication Map (TIM) in IEEE 802.11ah. The TIM may include paging status information and Association ID (AID) of the terminals to receive downlink data buffered in the AP. Paged terminals to receive downlink data may identify their own downlink reception status and allocated time slot used for downlink data reception included in the RAW based on the bitmap of received TIM. In a method for determining the size of the RAW, the number of time slots included in RAW is determined mainly based on downlink transmission status, but a medium access procedure for uplink transmission and an initial access procedure with the AP are not considered. Thus, medium access efficiency in time slots used for uplink transmission included in the RAW may be decreased. When the M2M terminal fails to access medium in the RAW, the M2M terminal may attempt to access medium in the general access period, to which general terminals (i.e., non-M2M terminals) also attempt to access, through the random backoff procedure based on EDCA manner. If the M2M terminals fail to access medium in RAW because excessive collisions between frames transmitted from the M2M terminals are generated in RAW, the number of terminals attempting to access medium in general access period may be increased. Thus, total throughput may be decreased. The method for allocating proper time slots included in the RAW according to the number of the M2M terminals attempting to access uplink medium may be needed so as to enhance efficiency of entire system.

The first type terminals 120_1, 120_2, 120_3, 120_4 may correspond to sensor only terminals, the second type terminals 130_1, 130_2 may correspond to cellular terminals, and the third type terminals 140_1, 140_2 may correspond to mixed mode terminals based on IEEE 802.11ah. The network 100 may correspond to a mixed mode basic service set (BSS) among a sensor only BSS, an offloading BSS, and the mixed mode BSS based on IEEE 802.11ah.

The sensor only terminal may perform M2M communication. The cellular terminal may be an offload only terminal distributing cellular traffic. The mixed mode terminal may support both the medium access manners of the sensor only terminal and the cellular terminal.

The first type terminals 120_1, 120_2, 120_3, 120_4, the second type terminals 130_1, 130_2, the third type terminals 140_1, 140_2, and the AP 110 may access medium according to corresponding medium access manner, and may perform data transmission.

Figure 2:
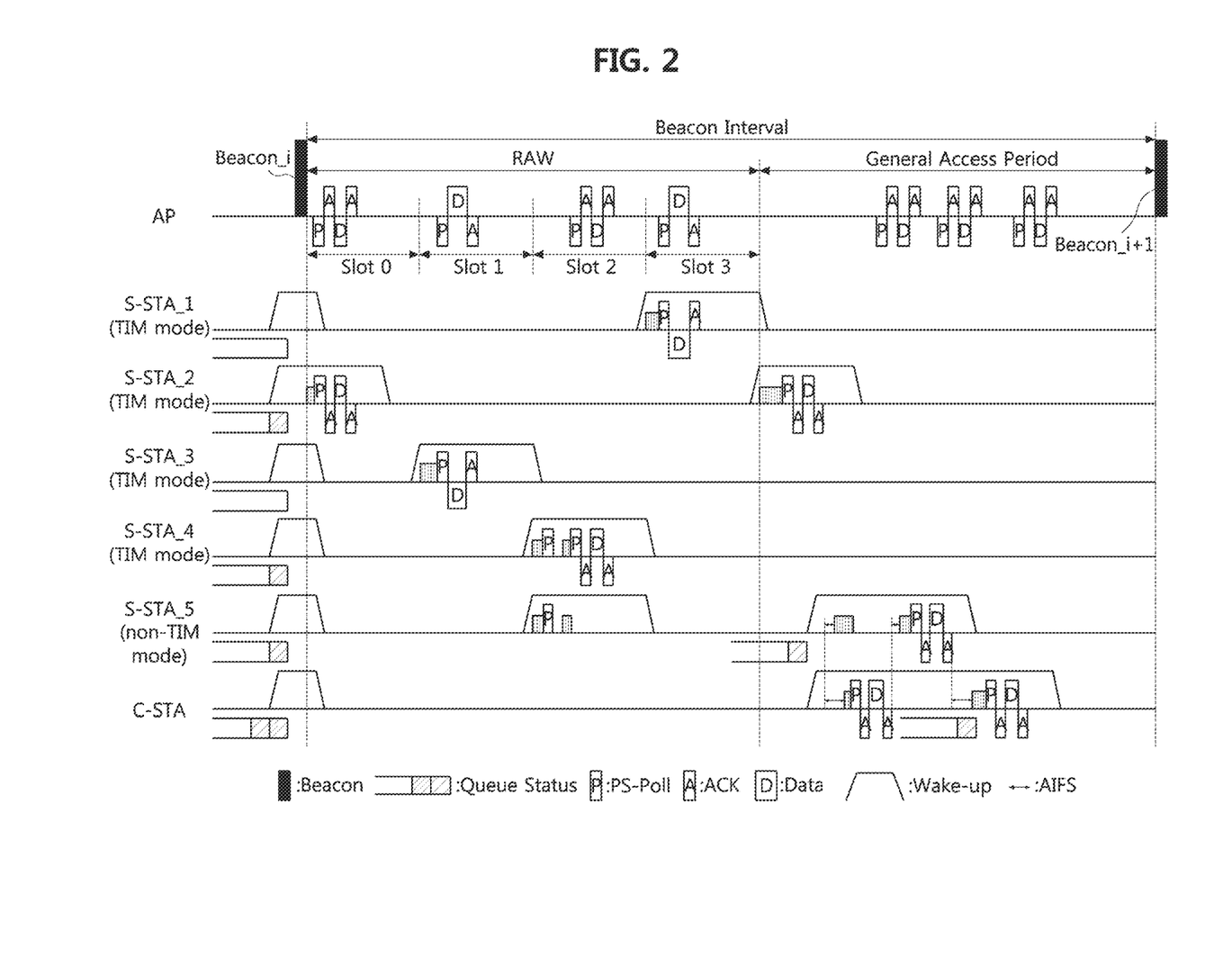
FIG. 2 is a conceptual diagram to illustrate a medium access procedure in wireless network according to an example embodiment of the present invention.

FIG. 2 is a conceptual diagram to illustrate a medium access procedure in wireless network according to an example embodiment of the present invention.

Referring to FIG. 2, the medium access procedure, an uplink transmission procedure, and a downlink transmission procedure of the AP, the first to fifth sensor terminals S-STA_1, S-STA_2, S-STA_3, S-STA_4, S-STA_5, and the cellular terminal C-STA are illustrated.

The AP may transmit the beacon frame (Beacon_i, Beacon_i+1) as illustrated in FIG. 2. A beacon interval may include the RAW and remained period except the RAW (hereafter, general access period) in the beacon interval. Also, the beacon frame may not be transmitted per the beacon interval. The beacon interval also may include a periodical RAW (PRAW) which is newly defined for paged non-TIM mode terminal.

Figure 3:
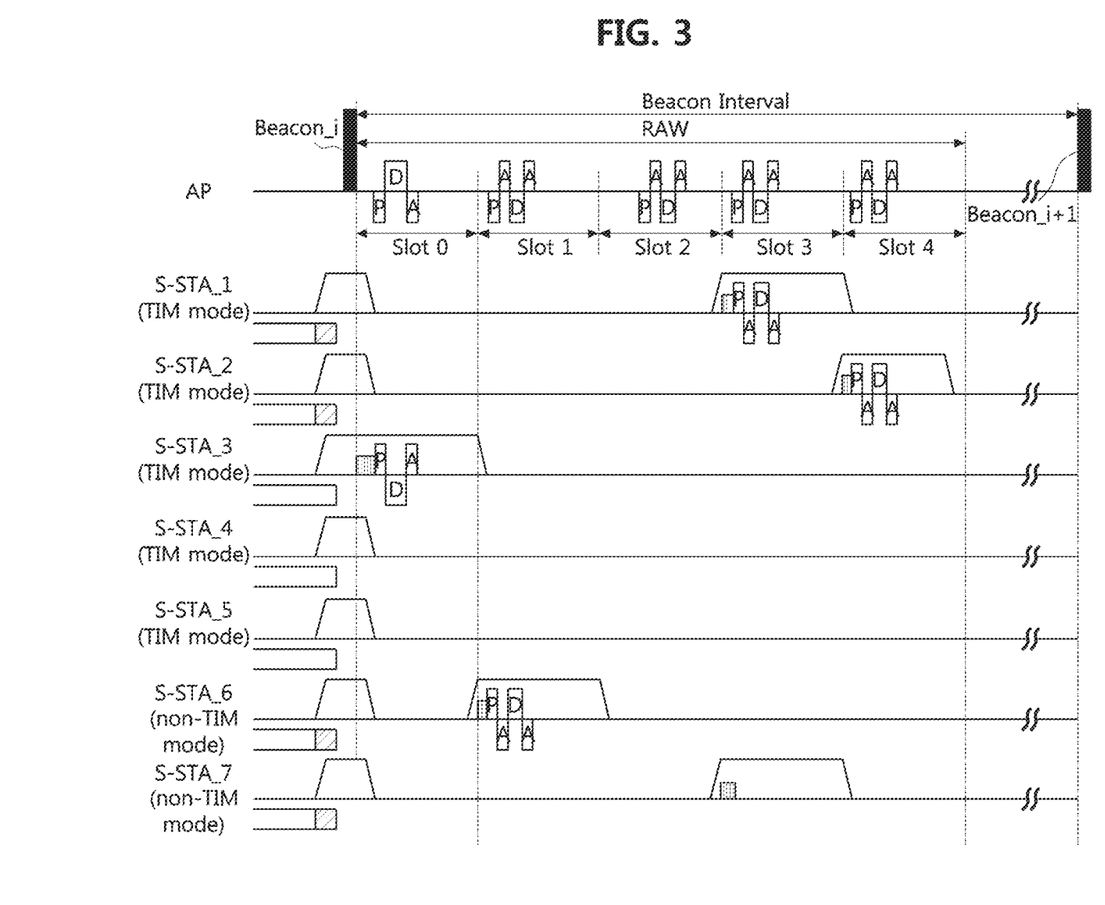
FIG. 3 is a conceptual diagram to illustrate an example embodiment about that a time slot is allocated to only one terminal or selected by only one terminal.

The cellular terminal C-STA may not attempt to access medium used for uplink transmission in the RAW. Each of the sensor terminals S-STA_1, S-STA_2, S-STA_3, S-STA_4, S-STA_5 may access medium used for uplink transmission both in the RAW and the general access period. The first to fourth terminals S-STA_1, S-STA_2, S-STA_3, S-STA_4 which mean terminals associated with the AP operate in the TIM mode. The fifth sensor terminal S-STA_5 is not associated with the AP, thus the fifth sensor terminal S-STA_5 operates in the non-TIM mode. Each of terminals operating in the non-TIM mode may be a terminal initially associated with AP or a terminal, which does not receive allocated AID from the AP, in terminals associated with the AP because it does not want an operation in the TIM mode. In FIG. 2 and FIG. 3, some example embodiments, in which AID 1, 2, 3, 4 is allocated to the first to fourth sensor terminals S-STA_1, S-STA_2, S-STA_3, S-STA_4 respectively, will be described.

First, example embodiments of medium access for downlink transmission in the RAW will be described, as follows. Here, the downlink slots included in the RAW present time slots in which the AP may transmit information to the sensor terminals S-STA_1, S-STA_2, S-STA_3, S-STA_4, S-STA_4. The AP may select sensor terminals to receive downlink data in the RAW among associated sensor terminals S-STA_1, S-STA_2, S-STA_3, S-STA_4 based on queue status of the AP, and may transmit information related to paged downlink transmission to the selected sensor terminals (hereafter, nsownlink transmission paged terminalsa) using the beacon frame (Beacon_i, Beacon_i+1). For example, the AP may transmit the information related to the paged downlink transmission using the TIM in the beacon frame (Beacon_i, Beacon_i+1). The bitmap of the TIM may include bit values corresponding to each AID according to sequence of the AID. Here, each bit may be 1 or 0. A value of 1 may indicate that downlink transmission for terminal having AID corresponding a position of bit presenting 1 is paged. A value of 0 may indicate that downlink transmission for terminal having AID corresponding a position of bit presenting 0 is not paged.

For example, when the bitmap of the TIM presents 1, 0, 1, 0 in sequence, the first sensor terminal S-STA_1 having AID 1 and the third sensor terminal S-STA_3 having AID 3 may identify that own is paged terminal for downlink transmission in the RAW based on the TIM in received beacon frame (Beacon_i) because the first and the third bit in the bitmap present 1.

The first and third terminals S-STA_1, S-STA_3 identifying that itself is paged downlink transmission terminal in the RAW may identify its own allocated time slot included in the RAW (hereafter, 'downlink slot') based on pre-obtained information and/or predefined algorithm (or function). For example, when the RAW includes L time slots (i.e., each slot index is 0, 1, . . . , L-1 respectively), the downlink slot may be identified by using the AID corresponding to the position of bit presenting 1 in the bitmap of the TIM and an equation 1.

slot index of downlink slot=(AID corresponding a position of bit presenting 1+offset) % L  [Equation 1]

Here, the % represents a division operator for a modular operation. The offset represents a value of 1 to L-1. That is, the offset represents a predefined value between the sensor terminals and the AP through a predefined signaling procedure (e.g., transmitting and receiving the beacon frame) or a preset procedure.

For example, when the offset represents a value of 2, the L represents a value of 4 as illustrated in FIG. 2, and the bitmap in the TIM of the current ($i^{th}$) beacon frame (Beacon_i) represents 1, 0, 1, 0 in sequence, the allocated downlink slot for the terminals will be described.

The downlink slots included in the RAW may be allocated to the first and third terminals S-STA_1, S-STA_3 having AID 1 and 3 respectively, because the positions of bits representing 1 are the first and third bits. Entire sensor terminals S-STA_1, S-STA_2, S-STA_3, S-STA_4, S-STA_5 may identify that the first and third slots (i.e., slot 2, slot 0) are the downlink slots by using the AID corresponding to the position of bit presenting 1 and the equation 1.

Referring to FIG. 2, the AP may set each value of bits corresponding to the first and third sensor terminals S-STA_1, S-STA_3 in the bitmap of the TIM in the beacon frame (Beacon_i) to a value of 1 so as to page downlink data transmission of the first and third sensor terminals S-STA_1, S-STA_3, and may transmit the set beacon frame (Beacon_i).

Each of the first and third sensor terminals S-STA_1, S-STA_3 receiving the beacon frame (Beacon_i) may identify that itself is a paged downlink transmission terminal in the RAW through the bitmap of the received TIM, and may identify that their allocated time slots (i.e., downlink slot) are the fourth and second time slots (i.e., slot 3, slot 1) respectively, and may attempt to access the downlink medium in the RAW using the random backoff contention procedure. In that case, for example, the random backoff contention procedure based on EDCA manner may be used.

For example, the paged downlink transmission terminals S-STA_1, S-STA_3 in the RAW may transmit a data transmission request frame to the AP, when the paged downlink transmission terminals S-STA_1, S-STA_3 access medium successfully by randomly selecting a value of backoff in allocated downlink slots (i.e., slot 3, slot 1). The data transmission request frame may be a frame requesting downlink data transmission to the AP.

For example, the data transmission request frame may be a PS-poll frame defined in IEEE 802.11, but the data transmission request frame is not necessarily limited to it.

The AP receiving the data transmission request frame may transmit the downlink data to corresponding sensor terminal (i.e., S-STA_1 or S-STA_3). The sensor terminal (i.e., S-STA_1 or S-STA_3) which received successfully the downlink data may transmit acknowledge (ACK) frame. The downlink transmission is ended when above procedure is completed.

Second, referring to FIG. 2, a method of medium access for uplink transmission in the RAW will be described, as follows. Here, the uplink slot included in the RAW may be a time slot in which the sensor terminals (e.g., S-STA_2, S-STA_4, S-STA_5) having the uplink data according to their own queue status may transmit the uplink data to the AP.

As illustrated in FIG. 2, the second and fourth sensor terminals S-STA_2, S-STA_4 among the sensor terminals S-STA_2, S-STA_4, S-STA_5 having the uplink data may operate in the TIM mode. The fifth sensor terminal S-STA_5 among the sensor terminals S-STA_2, S-STA_4, S-STA_5 having the uplink data may operate in the non-TIM mode. The fifth sensor terminal S-STA$_{13}$ 5 operates in the non-TIM mode which is not include in the TIM entry because the fifth sensor terminal S-STA_5 does not receive information of its allocated AID from the AP.

The fifth sensor terminal S-STA_5 operating in the non-TIM mode may randomly select the time slot used for uplink medium access (hereafter, uplink slot) included in the RAW.

The second and fourth sensor terminals S-STA_2, S-STA_4 operating in the TIM mode may identify their allocated time slot used for uplink medium access using the bitmap of the TIM and a mapping function (e.g., equation 1). The second and fourth sensor terminals S-STA_2, S-STA_4 desiring uplink data transmission may transfer from the sleep mode to the wakeup mode at TBTT so as to receive the beacon frame, and may identify their own allocated time slot used for uplink medium access included in the RAW based on the bitmap of the TIM in the received beacon frame and the mapping function. The second and fourth sensor terminals S-STA_2, S-STA_4 may identify its own allocated first time slot (i.e., slot 0) and third time slot (i.e., slot 2) respectively based on the L presenting 4, the offset presenting 2, and the mapping function (i.e., equation 1). Thus, the second and fourth sensor terminals S-STA_2, S-STA_4 may operate in the sleep mode until the arrival of corresponding time slot.

The second and fourth sensor terminals S-STA_2, S-STA_4 may attempt to access the uplink medium at a start point of their own allocated uplink slot (i.e., slot 0, slot 3) based on the random backoff contention procedure. In that case, for example, the random backoff contention procedure based on EDCA manner may be used.

If the fifth sensor terminal S-STA_5 selects the third time slot (i.e., slot 2) except the downlink slot in the time slots (i.e., slot 0, slot 2) and selects randomly a value of backoff which is identical to a value of backoff randomly selected by the fourth sensor terminal S-STA_4, an access attempt of the fifth sensor terminal S-STA_5 may collide with an access attempt of the fourth sensor terminal S-STA_4. In that case, the fourth and fifth sensor terminals S-STA_4, S-STA_5 may randomly select a value of backoff and may attempt to access medium in same time slot. As illustrated in FIG. 2, when the fourth sensor terminal S-STA 4 accesses successfully uplink medium through the random backoff contention procedure in transmission opportunity (TXOP) which does not exceed the boundary of the third time slot (i.e., slot 2), the fourth sensor terminal S-STA 4 may transmit arbitrary frame requesting transmission of the ACK frame. The arbitrary frame may be, for example, the PS-poll frame, but the arbitrary frame is not necessarily limited to it.

The AP receiving the PS-poll frame to request transmission of the ACK frame may transmit the ACK frame to the fourth sensor terminal S-STA_4. The forth sensor terminal S-STA_4 receiving the ACK frame may transmit uplink data to the AP. The AP may transmit the ACK frame in response to the uplink data to the fourth sensor terminal S-STA_4, when the AP receives successfully the uplink data. The transmission of uplink data may be ended, when the above transmission procedure is successfully completed.

Third, referring to FIG. 2, a method of medium access for uplink transmission in the general access period will be described, as follows.

As illustrated in FIG. 2, both the fifth sensor terminal S-ST_5 which failed to access uplink medium in the RAW and the cellular terminal C-STA may attempt to access uplink medium in the general access period through the random backoff contention procedure based on EDCA manner. The cellular terminal C-STA may transmit the PS-poll frame requesting transmission of the ACK frame to the AP when the cellular terminal C-STA accesses successfully uplink medium through the random backoff contention procedure at first. The AP may transmit the ACK frame in response to the PS-poll frame. After that, the cellular terminal C-STA may transmit the uplink data to the AP. The uplink transmission may be completed when the AP transmits the ACK frame in response to the uplink data. After that, the fifth sensor terminal S-STA_5 may access successfully uplink medium through the random backoff contention procedure, as above described manner.

In the present invention, it will be described that a method for determining optimum size of the RAW and a method for estimating the number of sensor terminals which attempt to access uplink medium so as to enhance efficiency of medium access in uplink time slot included in the RAW.

The AP may page the time slots used for downlink transmission included in the RAW using the bitmap of the TIM in the beacon frame. However, generally the AP may not allocate properly the time slots used for uplink transmission included in the RAW to the sensor terminals because the AP does not know exactly the number of sensor terminals desiring uplink data transmission. The number of the sensor terminals desiring uplink data transmission or initial access with the AP may be estimated based on the method for estimating the number of uplink sensor terminals described in the present invention.

In the present invention, the RAW supporting both the uplink and downlink transmission may be considered according to IEEE 802.11ah. The uplink slot may be paged based on the AID of the sensor terminal and the mapping function, as above described procedure. The terminals desiring initial access with the AP may randomly select time slot used for medium access in the uplink slots included in the RAW.

The sensor terminal desiring uplink data transmission may attempt to access medium in allocated time slots according to the AID of the sensor terminal and the mapping function, but the attempted medium access may be failed by other sensor terminal (e.g., S-STA_5 illustrated in FIG. 2) performing initial uplink access. The sensor terminal may access successfully medium in the uplink slot included in the RAW without any collision, as following cases. A first case is that the uplink slot is allocated to only one the sensor terminal or is selected by only one the sensor terminal (hereafter, first type success case). A second case is that the sensor terminal accesses successfully to medium in the uplink slot during first random backoff contention procedure without any collision even through the uplink slot is allocated to a plurality of sensor terminals or is selected by a plurality of sensor terminals (hereafter, second type success case).

The AP may measure the number of time slots ($N_{succ}$) (hereafter, measure the number of time slot), in which arbitrary sensor terminal accesses successfully to medium without collision, in entire time slots included in the RAW. The probability of medium access success in the uplink slots ($P_{succ}$) (hereafter, uplink access success probability) may be calculated based on the measured number of the time slots, as below equation 2.

$$\tilde{P}_{succ} = \frac{\tilde{N}_{succ}}{L_{UL}} \quad \text{[Equation 2]}$$

In the equation 2, the $\tilde{P}_{succ}$ represents the calculated uplink access success probability, the $\tilde{N}_{succ}$ represents the measured number of the uplink access success slots, and the $L_{UL}$ represents the number of the uplink slots included in the RAW. For example, the uplink slots may present remained time slots except the downlink slots in entire time slots included in the RAW. In that case, the number of the uplink slots ($L_{UL}$) may be calculated by subtracting the number of the downlink slots ($L_{DL}$) from the number of the entire time slots (L) included in the RAW, as shown in the below equation 3.

$$L = L_{UL} + L_{DL} \quad \text{[Equation 3]}$$

First, the first type success case will be described, as follows.

FIG. 3 is a conceptual diagram to illustrate an example embodiment about that a time slot which is allocated to only one terminal or selected by only one terminal. Referring to FIG. 3, the L presents a value of 5, the bitmap of the TIM in the current ($i^{th}$) beacon frame presents 0, 0, 1, 0, 0 in sequence, and the offset of the equation 1 presents a value of 2.

As illustrated FIG. 3, the sixth sensor terminal S-STA_6 having uplink data may randomly select the second time slot (i.e., slot 1) in uplink slots because the sixth sensor terminal S-STA_6 operates in non-TIM mode, and then may attempt to access medium in the selected second time slot. On the other hand, the fourth sensor terminal S-STA_4 which operates in the TIM mode and has AID 4 may identify own allocated uplink slot (i.e., the second time slot (slot 1)) according to the equation 1. However, the fourth sensor terminal S-STA_4 does not attempt to access medium in the second time slot because the fourth sensor terminal S-STA_4 has no uplink data. Thus, the second time slot (i.e., slot 1) may be as the uplink access success slot because the second time slot (i.e., slot 1) is selected by only the sixth sensor terminal S-STA_6.

Meanwhile, the second sensor terminal S-STA_2 operating in the TIM mode may identify own allocated fifth time slot (i.e., slot 4) using the mapping function and the offset presenting 2 in the same manner. The second sensor terminal S-STA_2 may attempt to access medium for uplink data transmission in the allocated fifth time slot (i.e., slot 4). The fifth time slot (i.e., slot 4) is only used by the second sensor terminal S-STA_2 attempting medium access, thus, any collision is not generated in the fifth time slot (i.e., slot 4). That is, the fifth time slot (i.e., slot 4) may be as the uplink access success slot.

An equation 4 may be used for calculating a probability of the first type success case ($p_{s,1}$) which presents that arbitrary time slot (e.g., second time slot (i.e., slot 1) and fifth time slot (i.e., slot 4) illustrated in FIG. 3) in uplink slots is allocated to only one terminal or is selected by only one terminal.

$$p_{s,1} = \frac{N}{L_{UL}} \left(1 - \frac{1}{L_{UL}}\right)^{N-1} \quad \text{[Equation 4]}$$

Here, the N represents the number of terminals attempting to access uplink medium (hereafter, uplink access attempt terminals).

The second type success case will be described, as follows. As above description, the second type success case presents that one sensor terminal accesses successfully medium through first random backoff contention procedure without any collision even through the time slot is allocated to a plurality of sensor terminals or is selected by a plurality of sensor terminals.

Referring again to FIG. 3, the first sensor terminal S-STA_1 operating in the TIM mode may identify own assigned fourth time slot (i.e., slot 3) using the mapping function and the offset presenting 2. And, the first sensor terminal S-STA_1 desiring uplink data transmission may attempt to access medium in the fourth time slot (i.e., slot 3). In an example embodiment, the seventh sensor terminal S-STA_7 operating in the non-TIM mode may randomly select the fourth time slot (i.e., slot 3) and may attempt to access medium in the selected fourth time slot (i.e., slot 3). The first sensor terminal S-STA_1 may access successfully medium in the fourth time slot (i.e., slot 3), which is allocated to the first sensor terminal S-STA_1 and is selected by the seventh sensor terminal S-STA_7, through first random backoff contention procedure without collision.

An equation 5 may be used for calculating the average number of uplink access attempt terminals ($N_{coll}$) when a plurality of sensor terminals attempts to access medium in arbitrary uplink slot (i.e., fourth time slot (slot 3) illustrated in FIG. 3) because the arbitrary uplink slot is allocated to a plurality of sensor terminals or is selected by a plurality of sensor terminals.

$$N_{coll} = \sum_{k=2}^{N} k \cdot \binom{N}{k} \left(\frac{1}{L_{UL}}\right)^{k} \left(1 - \frac{1}{L_{UL}}\right)^{N-k} \quad \text{[Equation 5]}$$

Here, the peon represent a probability about that a plurality of terminals select a same uplink slot. The peon may be represented as the below equation 6.

$$p_{coll} = 1 - p_{s,1} - p_{idle}, \quad \text{[Equation 6]}$$

where $$p_{idle} = \left(1 - \frac{1}{L_{UL}}\right)^{N}$$

When one time slot is allocated to a plurality of terminals or is selected by a plurality of terminals, a probability of the second type success case which presents a probability that only one terminal in a plurality of terminals accesses successfully medium through the random backoff contention procedure may be presented as the below equation 7.

$$p_{s,2} = p_{coll} \frac{N_{coll}}{W_{min}} \sum_{k=0}^{W_{min}-1} \left(\frac{W_{min} - k - 1}{W_{min}}\right)^{N_{coll}-1}$$ [Equation 7]

In the equation 7, the $W_{min}$ presents the minimum size of the backoff window.

Thus, the uplink access success probability ($P_{succ}$) presents a probability that any collision in arbitrary uplink is not generated during first random backoff contention procedure. The uplink access success probability ($P_{succ}$) may be presented as below equation 8 according to the equation 4 and the equation 7.

$$p_{succ} = p_{s,1} + p_{s,2}$$ [Equation 8]
$$= \frac{N}{L_{UL}}\left(1 - \frac{1}{L_{UL}}\right)^{N-1} +$$
$$p_{coll} \frac{N_{coll}}{W_{min}} \sum_{k=0}^{W_{min}-1} \left(\frac{W_{min} - k - 1}{W_{min}}\right)^{N_{coll}-1}$$
$$= f(L_{UL}, N)$$

Here, the $P_{succ}$ represents a function including a parameter related to the number of uplink slots ($L_{UL}$) and a parameter related to the number of uplink access attempt terminals (N). If an equation 9 presenting an inverse function of the equation 8 is used, estimated value ($\hat{N}$) of the number of uplink access attempt terminals may be calculated based on the number of uplink slots ($L_{UL}$) and the estimated uplink access success probability ($\tilde{P}_{succ}$).

$$\hat{N} = f^{-1}(L_{UL}, \tilde{P}_{succ})$$ [Equation 9]

The present invention may comprises a method for determining optimum size of the RAW based on the estimated number of uplink access attempt terminals ($\hat{N}$). The optimum size of the RAW may be, for example, size of the RAW to maximize uplink throughput. A method for maximizing uplink throughput may be, for example, a method for maximizing the uplink access success probability (($P_{succ}$)). Generally, the size of the RAW may be determined based on the number of the terminals.

A relation of the number of time slots used for uplink medium access ($L_{UL}$) and the number of uplink access attempt terminals (N) may be present as a ratio ($\gamma$) of the number of time slots used for uplink medium access to the number of uplink access attempt terminals according to an equation 10.

$$L_{UL} = \gamma \cdot N$$ [Equation 10]

The present invention may comprise a method for calculating optimum $\gamma$ (i.e., $\gamma^*$) to maximize the uplink access success probability based on the estimated number of uplink access attempt terminals ($\hat{N}$). An equation 11 may present a method for calculating $\gamma^*$ based on differentiated equation 8 so as to calculate optimum y to maximize the uplink access success probability.

$$\frac{df(L_{UL}, N)}{d\gamma} = \frac{df(\gamma N, N)}{d\gamma} = \frac{d}{d\gamma}\left[\frac{1}{\gamma}\left(1 - \frac{1}{\gamma N}\right)^{N-1} + \right.$$ [Equation 11]

$$\left. \left(1 - \frac{1}{\gamma}\left(1 - \frac{1}{\gamma N}\right)^{N-1} - \left(1 - \frac{1}{\gamma N}\right)^N\right) \right.$$
$$\left. \frac{N_{coll}}{W_{min}} \sum_{k=0}^{W_{min}-1} \left(\frac{W_{min} - k - 1}{W_{min}}\right)^{N_{coll}-1}\right] = 0$$

In the equation 11, the $N_{coll}$ may be defined as the equation 5. Also, the $N_{coll}$ may be approximated to an equation 12 for convenience.

$$N_{coll} \approx \frac{N(1 - p_{s,1})}{L_{UL} p_{coll}} =$$ [Equation 12]

$$\frac{N\left(1 - \frac{N}{L_{UL}}\left(1 - \frac{1}{L_{UL}}\right)^{N-1}\right)}{L_{UL}\left(1 - \frac{N}{L_{UL}}\left(1 - \frac{L}{L_{UL}}\right)^{N-1} - \left(1 - \frac{1}{L_{UL}}\right)^N\right)} \approx$$

$$\frac{1 - \frac{1}{\gamma} e^{-\frac{1}{\gamma}}}{\gamma\left(1 - \frac{1}{\gamma} e^{-\frac{1}{\gamma}} - e^{-\frac{1}{\gamma}}\right)} = g(\gamma)$$

The equation 12 may be similar to the equation 5 because the number of sensor terminals attempting to access one uplink slot is similar to an average of the number of sensor terminals attempting to access entire uplink slots. When the number of uplink access attempt terminals (N) is very large, the $N_{coll}$ may be approximated using an exponential function. Thus, when a plurality of sensor terminals attempts to access one uplink slot, the average of the number of uplink access attempt terminals may be presented as a function $g(\gamma)$ of $\gamma$ in the equation 12.

An equation 13 may represent equation 11 developed based on the equation 12.

$$\frac{df(\gamma N, N)}{d\gamma} \approx$$ [Equation 13]
$$\frac{d}{d\gamma}\left[\frac{1}{\gamma} e^{-\frac{1}{\gamma}} + \frac{1 - \frac{1}{\gamma} e^{-\frac{1}{\gamma}}}{\gamma W_{min}} \sum_{k=0}^{W_{min}-1} \left(\frac{W_{min} - k - 1}{W_{min}}\right)^{g(\gamma)-1}\right]$$

Figure 7:
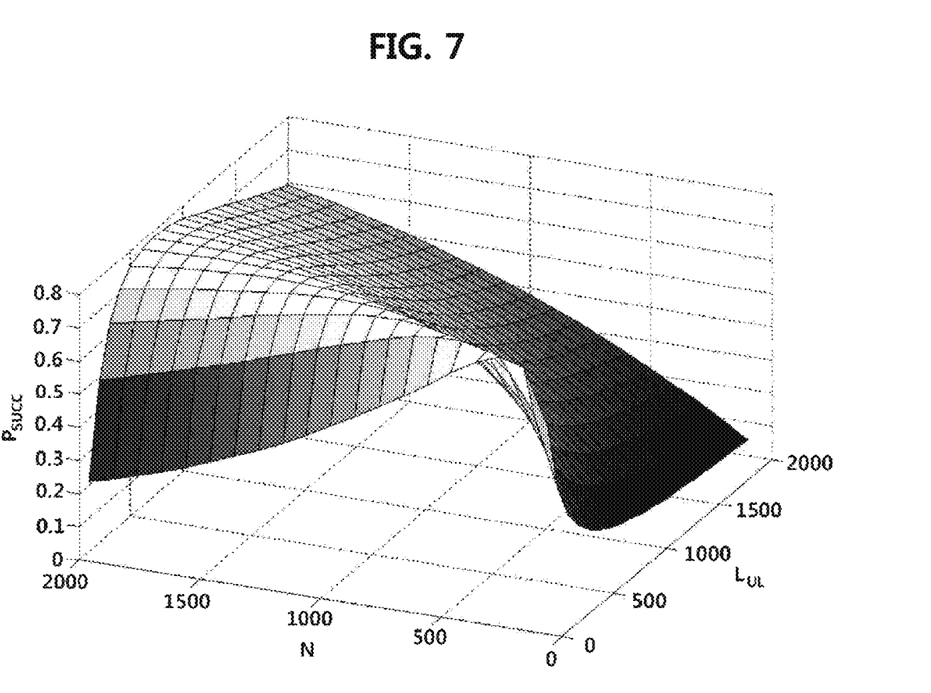
FIG. 7 is a graph to illustrate a distribution of uplink access success probability without collision according to an example embodiment of the present invention, and existence of the optimum value.

A value of $\gamma^*$ maximizing the uplink access success probability (($P_{succ}$)) without any collision may be calculated numerically using the equation 13. FIG. 7 is a graph to illustrate a value of tegraphon may be calculatuplink slots ($L_{UL}$) and the number of uplink access attempt terminals (N).

An equation 14 may represent a method for determining the number of uplink slots include in the RAW to maximize the uplink access success probability in the following beacon interval using $\gamma^*$.

$$L_{UL} = \min[\max\{L_{UL,min}, \lceil L^*_{UL}\rceil\}, L_{UL,max}], \text{ where}$$
$$L^*_{UL} = \gamma^* \cdot \hat{N}$$ [Equation 14]

In the equation 14, the $L_{UL,min}$ and the $L_{UL,max}$ represent a minimum value and a maximum value of predefined number of uplink slots respectively.

The optimum number of uplink slots ($L_{UL}$) in the following beacon interval may be determined based on the estimated number of uplink access attempt terminals and the equation 14. Both the determined optimum number of uplink slots ($L_{UL}$) and the number of downlink slots to be include in the RAW in the following beacon interval may be used for determining the size of the RAW in the following beacon interval based on the equation 3. The AP may determine the number of downlink slots ($L_{DL}$) to be included in RAW in the following beacon interval based on the queue status of the AP (e.g., existing status of downlink data to be transmitted to each associated sensor terminal).

An equation 15 may present a time duration of RAW ($T_{RAW}$) in the beacon interval.

$$T_{RAW} = L \cdot T_{slot} \quad [\text{Equation 15}]$$

Here, the $T_{slot}$ present a time duration of unit of the time slot.

Figure 4:
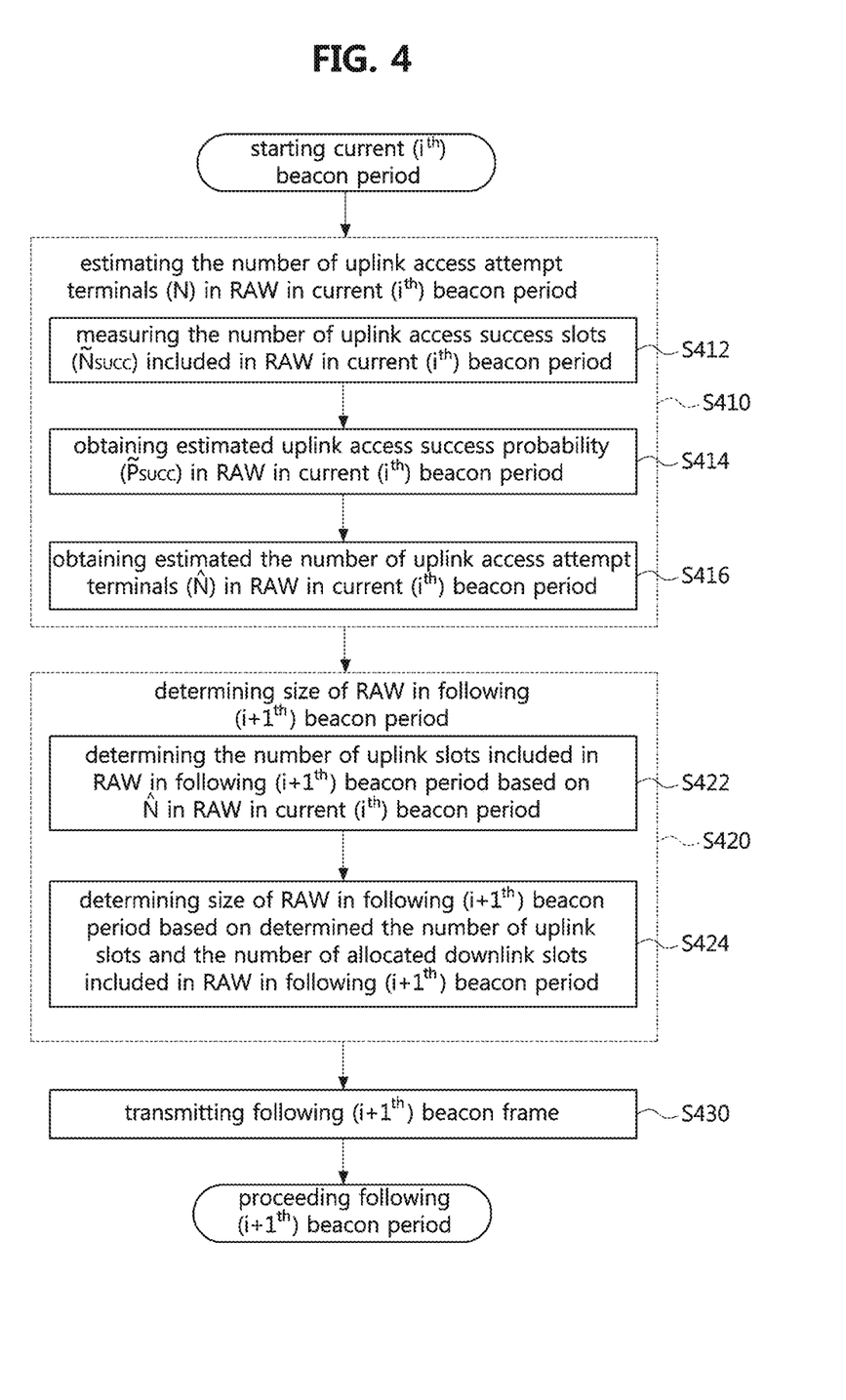
FIG. 4 is a flow chart to illustrate a method for operation of AP according to an example embodiment of the present invention.

FIG. 4 is a flow chart to illustrate a method for operation of AP according to an example embodiment of the present invention.

For convenience, it will be described that a method for determining the size of the RAW to be included in the following (i+1$^{th}$) beacon interval illustrated in FIG. 3.

First, the AP may calculate the estimated number of uplink access attempt terminals ($\hat{N}$) in the RAW in current beacon interval (S410).

The step S410 may comprise following steps.

First, the AP may measure the number of uplink access success slots ($N_{succ}$) included in the RAW in the current (i$^{th}$) beacon interval. Referring to FIG. 3, the AP may identify success of uplink access in the first, fourth, and fifth time slots (i.e., slot 0, 3, and 4). Thus, the AP may determine that the measured number of uplink access success slots ($\tilde{N}_{succ}$) is a value of 3.

The AP may calculate the estimated uplink access successful probability ($\tilde{P}_{succ}$) based on the measured number of uplink access success slots ($\tilde{N}_{succ}$). For example, the estimated uplink access successful probability ($\tilde{P}_{succ}$) may be calculated based on the measured number of uplink access success slots ($\tilde{N}_{succ}$) obtained in the step S412, the number of uplink slots ($L_{UL}$) included in the RAW in the current (i$^{th}$) beacon interval, and the equation 2. As illustrated FIG. 3, the bitmap of the TIM in the current (i$^{th}$) beacon frame presents 0, 0, 1, 0, 0 in sequence, thus, the L, the $L_{UL}$, and the $L_{DL}$ may be 5, 4, and 1 respectively. Thus, the $\tilde{P}_{succ}$ may be calculated as a value of 0.75 based on the $\tilde{N}_{succ}$ presenting 3, the $L_{UL}$ presenting 4, and the equation 2.

The AP may estimate the number of uplink access attempt terminals (N) based on the to estimated uplink access success probability ($\tilde{P}_{succ}$) obtained in the step S412 (S416). For example, the AP may calculate the estimated N ($\hat{N}$) using the equation 9. In following description, the $\hat{N}$ will be assumed as a value of 4.

Next, the AP may determine the size of the RAW in the following (i+1$^{th}$) beacon interval based on the estimated number of uplink access attempt terminals ($\hat{N}$) (S420).

The step S420 may comprise following steps.

First, the AP may determine the number of uplink slots ($L_{UL}$) to be included in the RAW in the following (i+1$^{th}$) beacon interval based on the estimated number of uplink access attempt terminals ($\hat{N}$=4) (S422). For example, the AP may determine the number of uplink slots ($L_{UL}$) to be included in the RAW in the following (i+1$^{th}$) beacon interval based on the estimated number of uplink access attempt terminals ($\hat{N}$=4) and the equation 14. Here, it is assumed that the number of uplink slots ($L_{UL}$) is determined as a value of 1.

Next, the AP may calculate the size of the RAW in the following (i+1$^{th}$) beacon interval by adding the number of uplink slots ($L_{UL}$) to the number of downlink slots ($L_{DL}$) to be included in the RAW in the following (i+1$^{th}$) beacon interval (S424). Here, it is assumed that the number of downlink slots ($L_{DL}$) is a value of 2. In that case, the number of uplink slots ($L_{UL}$) and the number of downlink slots ($L_{DL}$) are determined as 1 and 2 respectively, thus, the size of the RAW in the following (i+1$^{th}$) beacon interval may be determined as a value of 3 (i.e., $L_{UL}+L_{DL}$) based on the equation 3. Also, a duration of the RAW in the following (i+1$^{th}$) beacon interval may be determined as $3 \cdot T_{slot}$.

Next, the AP may transmit the following (i+1$^{th}$) beacon frame (S430).

Figure 5:
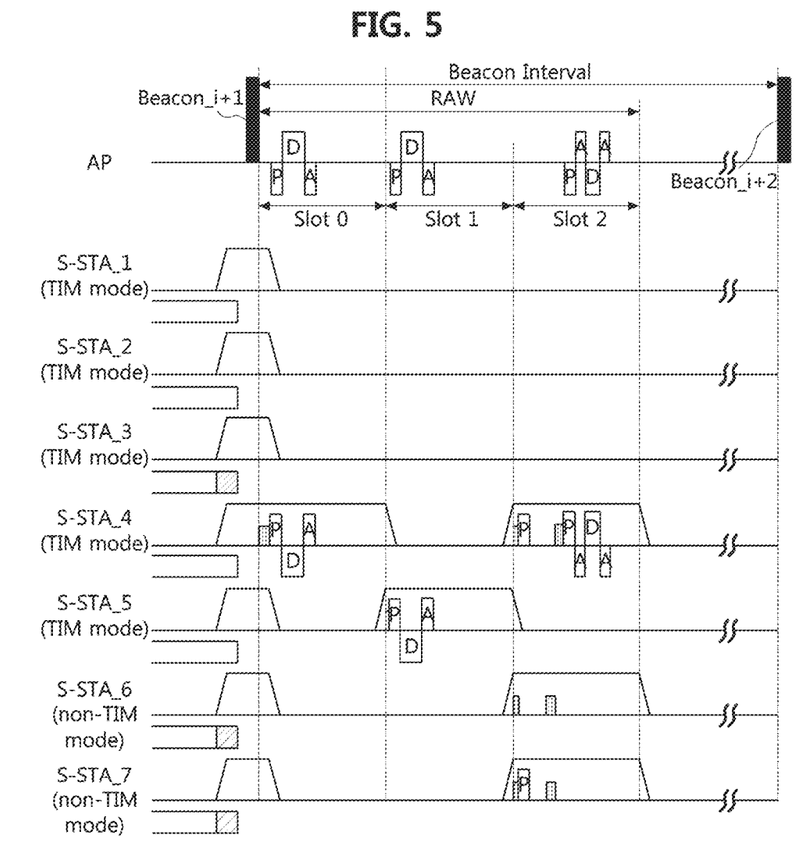
FIG. 5 is a conceptual diagram to illustrate an operation of each entity based on the RAW and the bitmap of the TIM determined according to an example embodiment of the present invention.

FIG. 5 is a conceptual diagram to illustrate an operation of each entity based on the RAW and the bitmap of the TIM determined according to an example embodiment of the present invention. In more detail, the AP may perform monitoring in the current (i$^{th}$) beacon interval illustrated in FIG. 3, and may calculate the size of the RAW based on the monitoring result. The FIG. 5 illustrates the operation of each entity (i.e., AP, terminal, etc.) in the following (i+1) beacon interval when the AP transmits the following (i+1$^{th}$) beacon frame which is generated based on operation information in the current (i$^{th}$) beacon interval and the terminal receives the following (i+1$^{th}$) beacon frame.

The number of time slots, the number of downlink slots, and the number of uplink slots to be included in the RAW in the current (i$^{th}$) beacon interval may be 3, 2, and 1 respectively according to FIG. 3 and above description related to FIG. 3. Also, it will be assumed that the bitmap of the TIM which is determined based on the operation in the current (i$^{th}$)) beacon interval presents 0, 0, 0, 1, 1 in sequence and the offset is a value of 3.

In that case, the fourth and fifth bits are 1 according to the above mentioned bitmap of the TIM, thus, the downlink slots corresponding positions of the fourth and fifth bits are allocated to the fourth and fifth sensor terminals S-STA_4, S-STA_5 respectively. That is, the allocated downlink slots may be the first and second time slots (i.e., slot 0, slot 1) respectively based on the above mentioned bitmap of the TIM, the offset, and the equation 1 as illustrated in FIG. 5.

FIG. 6 is a program code to illustrate a method according to an example embodiment of the present invention. In more detail, the program code illustrates the method for determining the size of the RAW according to an example embodiment of the present invention.

The program code illustrated in FIG. 6 may be executed on a processor included in the AP.

FIG. 7 is a graph to illustrate a distribution of uplink access success probability without collision according to an example embodiment of the present invention. The graph represents existence of the optimum value.

The example embodiments of the present invention have following advantages. However, it is not intended that all example embodiments of the present invention have the advantages. Thus, it is not understood that the scope of the present invention is limited to example embodiments related to the advantages.

According to some example embodiments of the present invention, the efficiency of uplink medium access of the M2M terminal in the RAW may be improved by increasing medium access opportunity of the terminal attempting uplink data transmission or initial access with the AP.

According to some example embodiments of the present invention, the efficiency of uplink medium access in the general access period may be improved because the number of the uplink access attempt terminals in the general access period is decreased by improving the efficiency of uplink medium access in the RAW, thus, the throughput of entire system may be improved.

In the process and method according to the present invention, one of ordinary skill in the art to which the present invention belongs may understand that functions implemented in the process and method may be implemented in a different order. Also, roughly described steps and operations are provided as only example, and do not depart from the scope of the example embodiments of the present invention. A part of the steps and operation may be optional. The example embodiments of the present invention are implemented as combinations of some steps and operations, or as combinations of additional steps and operations.

In example embodiments of the present invention, the operations, the processes, and so on described in this specification may be implemented as a computer readable command stored in a computer readable medium. The computer readable command may be implemented by a processor of a mobile device, a network component, and other computing device.

The method and apparatus according to the present invention are described based on example embodiments illustrated in the figures to help understand, but it is merely examples. The one of ordinary skill in the art may understand that various modifications and other similar example embodiments may be derived from the method and apparatus according to the present invention. Thus, the authentic technical protection scope of the present invention may be determined by attached claims.

What is claimed is:

1. A method for determining a size of a restricted access window (RAW), performed in an access point in a wireless network, the method comprising:
   estimating a number of terminals attempting to access uplink slots included in a first RAW set in a first beacon interval, wherein the uplink slots included in the first RAW are used for transmission of uplink data; and
   determining a size of a second RAW set in a second beacon interval next to the first beacon interval based on the estimated number of terminals,
   wherein the second RAW includes uplink slots and at least one downlink slot, wherein the uplink slots included in the second RAW are used for transmission of uplink data, and the at least one downlink slot included in the second RAW is used for transmission of downlink data,
   wherein each of the first RAW and the second RAW is allocated to at least one terminal, and the at least one terminal attempts to access the uplink slots included in the first RAW or the second RAW using a random access procedure, and
   wherein the wireless network is using communication protocols defined in Institute of Electrical and Electronics Engineers (IEEE) 802.11.

2. The method of claim 1, wherein the determining the size of the second RAW comprises:
   determining a number of uplink slots included in the second RAW based on the estimated number of terminals; and
   determining the size of the second RAW based on the determined number of uplink slots and the at least one downlink slot included in the second RAW.

3. The method of claim 1, wherein the estimating the number of terminals comprises:
   measuring a number of uplink slots in which the uplink data is successfully transmitted included in the first RAW; and
   estimating a number of terminals which transmit successfully the uplink data based on the measured number of uplink slots.

4. The method of claim 3, wherein the estimating the number of terminals which transmit successfully the uplink data comprises estimating the number of terminals which transmit successfully the uplink data based on the measured number of uplink slots and a total number of uplink slots included in the first RAW.

5. A method for determining a size of a restricted access window (RAW), performed in an access point in a wireless network, the method comprising:
   measuring a number of uplink slots in which uplink data is successfully transmitted included in a first RAW set in a first beacon interval;
   estimating a number of terminals attempting to access the uplink slots included in the first RAW based on the measured number of uplink slots; and
   determining a size of a second RAW which located after the first RAW based on the estimated number of terminals,
   wherein the second RAW includes uplink slots and at least one downlink slot, and
   wherein the uplink slots included in the second RAW are used for transmission of uplink data, and the at least one downlink slot included in the second RAW is used for transmission of downlink data,
   wherein each of the first RAW and the second RAW is allocated to at least one terminal, and the at least one terminal attempts to access the uplink slots included in the first RAW or the second RAW using a random access procedure, and
   wherein the wireless network is using communication, protocols defined in Institute of Electrical and Electronics Engineers (IEEE) 802.11.

6. The method of claim 5, wherein the estimating the number of terminals comprises estimating the number of terminals based on the measured number of uplink slots and a total number of uplink slots included in the first RAW.

7. The method of claim 6, wherein the estimating the number of terminals comprises:
   estimating a probability of access success in the uplink slots included in the first RAW without a collision based on the measured number of uplink slots and the total number of uplink slots included in the first RAW; and
   estimating the number of terminals based on the estimated probability.

8. The method of claim 7, wherein the estimating the number of terminals comprises estimating the number of terminals based on the estimated probability and the total number of uplink slots included in the first RAW.

9. The method of claim 8, wherein the estimating the number of terminals comprises estimating the number of terminals based on the estimated probability, the total number of uplink slots included in the first RAW, and a predefined function indicating a relation between the estimated probability, the total number of uplink slots included in the first RAW, and the number of terminals attempting to access the uplink slots included in the first RAW.

10. The method of claim 5, wherein the terminals attempt to access the uplink slots included in the first RAW based on a random backoff contention procedure.

11. The method of claim 5, wherein the first RAW includes at least one downlink slot used for transmission of downlink data.

12. The method of claim 11, wherein the uplink slots included in the first RAW are time slots other than the at least one downlink slot included in the first RAW.

13. The method of claim 5, wherein the access point sets the first RAW and a general access period in the first beacon interval, and the terminals access the general access period based on Enhanced Distributed Channel Access (EDCA) manner.

* * * * *